US011214695B2

(12) United States Patent
Zheng

(10) Patent No.: US 11,214,695 B2
(45) Date of Patent: Jan. 4, 2022

(54) EPOXY FUNCTIONAL COMPOSITION PROTECTING DYES FROM PHOTO-DEGRADATION AND CURED COATINGS PREPARED THEREFROM

(71) Applicant: Essilor International, Charenton-le-Pont (FR)

(72) Inventor: Haipeng Zheng, Carrollton, TX (US)

(73) Assignee: Essilor International, Charenton-le-Pont (FR)

( * ) Notice: Subject to any disclaimer, the term of this patent is extended or adjusted under 35 U.S.C. 154(b) by 7 days.

(21) Appl. No.: 16/463,148

(22) PCT Filed: Oct. 25, 2017

(86) PCT No.: PCT/EP2017/077266
§ 371 (c)(1),
(2) Date: May 22, 2019

(87) PCT Pub. No.: WO2018/095679
PCT Pub. Date: May 31, 2018

(65) Prior Publication Data
US 2019/0375948 A1 Dec. 12, 2019

(30) Foreign Application Priority Data
Nov. 23, 2016 (EP) .................................. 16306547

(51) Int. Cl.
C09D 5/32 (2006.01)
C09D 7/41 (2018.01)
C09D 163/00 (2006.01)
G02C 7/10 (2006.01)
B29D 11/00 (2006.01)
C08K 5/3415 (2006.01)
C08K 5/29 (2006.01)

(52) U.S. Cl.
CPC ............... C09D 5/32 (2013.01); C09D 7/41 (2018.01); C09D 163/00 (2013.01); G02C 7/10 (2013.01); B29D 11/00894 (2013.01); C08K 5/29 (2013.01); C08K 5/3415 (2013.01); G02C 2202/10 (2013.01)

(58) Field of Classification Search
CPC ...... C09D 5/32; C09D 159/00; C09D 163/00; C09D 175/06; C09D 183/04; G02C 7/10; G02C 2202/10; C08K 5/29; C08K 5/3415; C08G 18/686; C08G 18/758; B29D 11/00894; B29D 11/00865; A61K 8/492; A61K 8/8129
USPC ............. 351/159.65, 159.6, 159.56, 159.49, 351/159.57, 159.59, 159.62, 159.63, 351/159.73, 159.74
See application file for complete search history.

(56) References Cited

U.S. PATENT DOCUMENTS

| 5,178,800 | A | * | 1/1993 | Blum | B29D 11/00028 264/1.38 |
| 6,586,420 | B1 | * | 7/2003 | Yazaki | C07D 401/14 514/210.21 |
| 8,278,401 | B2 | | 10/2012 | Kong et al. | |
| 8,802,792 | B2 | * | 8/2014 | Carlson | C08G 63/54 525/523 |
| 2008/0247906 | A1 | * | 10/2008 | Heffels | G01N 21/643 422/52 |
| 2009/0311518 | A1 | | 12/2009 | Valeri | |
| 2012/0008217 | A1 | * | 1/2012 | Ishak | A61F 2/1613 359/722 |
| 2012/0293768 | A1 | * | 11/2012 | Lapprand | B29D 11/00865 351/159.6 |
| 2017/0043027 | A1 | * | 2/2017 | Rangaramanujam | A61K 49/0054 |

FOREIGN PATENT DOCUMENTS

| CA | 993240 | 7/1976 |
| EP | 0204304 | 12/1986 |
| EP | 2927717 | 10/2015 |
| JP | 2763612 B2 * | 6/1998 |
| JP | 2014-149514 | 8/2014 |
| WO | WO 02/08309 | 1/2002 |
| WO | WO 2007/111606 | 10/2007 |
| WO | WO 2008/146087 | 12/2008 |
| WO | WO 2010/109154 | 9/2010 |
| WO | WO 2010/111499 | 9/2010 |
| WO | WO 2011/080472 | 7/2011 |

(Continued)

OTHER PUBLICATIONS

Database WPI Week 201453 Thomson Scientific, London, GB, Aug. 21, 2014.
Enko et al., "Singlet Oxygen-Induced Photodegradation of the Polymers and Dyes in Optical Sensing Materials and the Effect of Stabilizers on These Processes" *The Journal of Physical Chemistry A*, 2013, 117:8873-8882.
International Search Report and Written Opinion issued in Corresponding International Patent Application No. PCT/EP2017/077266, dated Dec. 15, 2017.

(Continued)

*Primary Examiner* — Travis S Fissel
(74) *Attorney, Agent, or Firm* — Norton Rose Fulbright US LLP

(57) ABSTRACT

The present invention relates to an optical filtering coating composition, comprising at least one dye that at least partially inhibits transmission of light within the 400-500 nm wavelength range and has a conjugated chromophore, one or more epoxy compounds comprising at least one cycloaliphatic or aryl group, the ratio of the number of carbon atoms/the number of oxygen atoms in said epoxy compound being higher than or equal to 3, and the dry extract weight of such epoxy compounds present in the composition representing more than 33% of the dry extract weight of the composition. The coating composition can be applied on the main surface of the substrate of an optical article.

19 Claims, No Drawings

(56) References Cited

FOREIGN PATENT DOCUMENTS

| WO | WO 2012/076714 | 6/2012 |
| WO | WO 2012/153072 | 11/2012 |
| WO | WO 2013/013929 | 1/2013 |
| WO | WO 2013/171434 | 11/2013 |
| WO | WO 2015/097169 | 7/2015 |

OTHER PUBLICATIONS

Kultzow & Foxhill, "Cycloaliphatic Epoxy Resins," Presented at a meeting of the Thermoset Resin Formulators Association, Sep. 10-11, 2007, 6 pages.

Moura et al., "The Effect of Additives on the Photostability of Dyed Polymers," *Dyes and Pigments*, 1997, 33(3):173-196.

Yang et al., "Photostability of pyrromethene 567 dopes in ORMOSILs with various additives" *Optics Communications*, 2004, 239:415-420.

\* cited by examiner

EPOXY FUNCTIONAL COMPOSITION PROTECTING DYES FROM PHOTO-DEGRADATION AND CURED COATINGS PREPARED THEREFROM

CROSS-REFERENCE TO RELATED APPLICATIONS

This application is a national phase application under 35 U.S.C. § 371 of International Application No. PCT/EP2017/077226 filed 25 Oct. 2017, which claims priority to European Patent Application No. 16306547.7 filed 23 Nov. 2016. The entire contents of each of the above-referenced disclosures is specifically incorporated by reference herein without disclaimer.

The present invention relates to curable epoxy functional compositions containing an absorbing dye blocking wavelengths which may present an impact on the health in which the dye presents improved photo-resistance properties, to epoxy-based coatings obtained therefrom, and to optical articles, in particular ophthalmic lenses, containing such a coating.

In the optics field, it is usual to coat articles with coatings so as to impart the articles various mechanical and/or optical properties. Thus, classically, coatings such as impact-resistant, anti-abrasion/scratch-resistant and/or antireflection coatings are successively formed onto an ophthalmic lens.

It may be desirable to impart a filtering function to the optical article so as to prevent or limit transmission of specific wavelengths of light, especially harmful light to the retina, but this should be done without modifying its properties such as abrasion resistance, transparency or adhesion of the coatings.

Indeed, visible light as perceived by humans approximately extends over a spectrum ranging from a 380 nm wavelength to a 780 nm wavelength. The part of this spectrum ranging from around 400 nm to around 500 nm does correspond to high-energy wavelengths, essentially blue light.

Many studies (see for example Kitchel E., "The effects of blue light on ocular health", Journal of Visual Impairment and Blindness Vol. 94, No. 6, 2000 or Glazer-Hockstein and al., Retina, Vol. 26, No. 1. pp. 1-4, 2006) suggest that part of the blue light has phototoxic effects on human eye health, and especially on the retina. Ocular photobiology studies demonstrated that an excessively prolonged or intense exposure to blue light may induce severe ophthalmic diseases such as age-related macular degeneration (ARMD) or cataract. Some studies are for example described in the paper titled "Phototoxic Action Spectrum on a retinal Pigment Epithelium model of Age-Related macular Degeneration Exposed to Sunlight Normalized Conditions", by author Arnault, Barrau et al. Published on Aug. 23, 2013 on the plosone.org website. Thus, it is recommended to limit the exposure to blue light potentially harmful, in particular as regards the wavelength band with an increased dangerousness (420-450 nm).

Incorporating in a coating an optical filtering dye able to cut specific ranges of wavelengths can be difficult, as it is necessary to adapt the formulation of the optical coating composition. It is especially difficult to get a transparent coating without haze, due to poor solubility of dyes, and the adaptation of the formulation in order to solubilize the dyes might modify the properties of the coating.

Another problem is that most of absorbing dyes used for making coatings with optical filtering capability, and in particular yellow dyes, show photostability issues when exposed to the UV rays and/or sunlight.

Several references such as J. C. V. P. Moura, A. M. F. Oliveira-Campos, J. Griffiths, Dyes and Pigments, 33(3), 1997, 173-196 are related to the effect of additives on the photostability of dyes in polymers. The article Y. Yang, G. Qian, D. Su, M. Wang, Optics Communications, 239 (4-6), 2004, 415-420 suggests the use of photostable additives including 1,4-diazobicyclo[2,2,2]octane (DABCO), 2,2,6,6-tetramethylpiperidine (TMP) and coumarin 440 in order to improve the photostability of the dye pyrromethene 567 in silicate coatings. WO 2008/146087 discloses inks and coatings for the production of oxygen sensitive elements with improved photostability, using selected photostabilizers.

However, using this traditional stabilization approach by antioxidants, UV absorbers etc. can be very detrimental to the final coating performances when a significant amount of those additives is employed, which may lead to a decrease of coating hardness, rigidity, optical clarity, etc. In addition, some UV absorbers may interact with the epoxy resin or dye molecule during a curing process, leading to changes in the absorption wavelength range of the dye, or cause solubility or coating haze issues.

US 2009/0311518 discloses an abrasion resistant photo-curable acrylic coating composition that can provide good adhesion to subsequent coatings deposited thereon, comprising three different acrylate compounds, at least one compound having at least two epoxy groups and that does not comprise any silicon atom bearing hydrolysable groups or hydroxyl groups, a hydrolyzate of an epoxysilane having from 2 to 6 functional groups generating a silanol group under hydrolysis, at least one non polymerizable ether compound and initiators.

WO 02/08309 discloses a cationically polymerizable or crosslinkable composition comprising an onium gallate compound as the initiator for the cationic polymerization, and reactive epoxy containing compounds, vinyl ether containing compounds and/or cyclic ethers containing compounds. Various epoxy compounds comprising at least one cycloaliphatic or aryl group are disclosed.

However, these patent applications are not concerned with the photo-degradation or photostability of dyes.

In view of the foregoing, there is a need for an optical article capable of at least partially blocking transmission of light in the blue wavelength range of the light spectrum without affecting the functional properties of other coatings. The process for manufacturing such an article should be simple, easy to implement and reproducible. It is also desirable that the optical article selectively blocks a relatively narrow range of the spectrum, and exhibits a low level of yellowness.

Another objective is to obtain an optical filtering coating having an improved resistance to photo-degradation and an improved cosmetic appearance such as low haze.

The inventors discovered that improved photostability of dyes contained in a coating could be achieved by using specific reactive compounds (monomers) in the epoxy series. In addition, the selected epoxy reactive compounds showed good compatibility with dyes, leading to low haze coatings.

To address the needs of the present invention and to remedy to the mentioned drawbacks of the prior art, the applicant provides an optical filtering coating composition, comprising at least one dye that at least partially inhibits transmission of light within the 380 nm-780 nm wavelength range, and has a conjugated chromophore, one or more epoxy compounds comprising at least one cycloaliphatic or aryl group, the ratio of the number of carbon atoms/the number of oxygen atoms in said epoxy compound being higher than or equal to 3, and the dry extract weight of such epoxy compounds present in the composition representing more than 33% of the dry extract weight of the composition.

In one embodiment, the dye that at least partially inhibits transmission of light within the 380 nm-780 nm wavelength range, and has a conjugated chromophore is at least one absorbing dye that has a conjugated chromophore and at least partially inhibits transmission of light in at least one selected wavelength range included within the 400 nm-500 nm wavelength range.

The coating composition of the present invention, which is mainly based on epoxy monomers, can be applied on the main surface of the substrate of an optical article. In this regard, the invention also relates to an optical article having at least one main surface comprising a coating obtained by depositing on a substrate and curing the composition mentioned above.

The present invention thus uses a specific coating dedicated to the filtering function, which avoids modifying the added values provided by the other functional coatings that may be traditionally present at the surface of the optical article.

As used herein, when an article comprises one or more layer(s) or coating(s) on the surface thereof, "depositing a layer or a coating onto the article" means that a layer or a coating is deposited onto the uncovered (exposed) surface of the article external coating, that is to say the coating that is the most distant from the substrate.

As used herein, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coating(s) may be interleaved between the substrate/coating and the relevant coating (however, it does preferably contact said substrate/coating), and (iii) does not necessarily completely cover the substrate/coating. When a coating 1 is said to be located "under" a coating 2, it should be understood that coating 2 is more distant from the substrate than coating 1.

The optical article according to the invention is preferably a transparent optical article, in particular an optical lens or lens blank, more preferably an ophthalmic lens or lens blank.

The term "ophthalmic lens" is used to mean a lens adapted to a spectacle frame to protect the eye and/or correct the sight. Said lens can be chosen from afocal, unifocal, bifocal, trifocal and progressive lenses. Although ophthalmic optics is a preferred field of the invention, it will be understood that this invention can be applied to optical elements of other types where filtering specified wavelengths may be beneficial, such as, for example, lenses for optical instruments, safety goggles, filters particularly for photography, astronomy or the automobile industry, optical sighting lenses, ocular visors, optics of lighting systems, screens, glazings, etc.

If the optical article is an optical lens, it may be coated on its front main surface, rear main side, or both sides with the coating of the invention. As used herein, the rear face of the substrate is intended to mean the face which, when using the article, is the nearest from the wearer's eye. It is generally a concave face. On the contrary, the front face of the substrate is the face which, when using the article, is the most distant from the wearer's eye. It is generally a convex face. The optical article can also be a plano article.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for a stack of one or more functional coatings or layers.

The substrate of the optical article, coated on at least one main face with a coating according to the invention, may be a mineral or an organic glass, for instance an organic glass made from a thermoplastic or thermosetting plastic, generally chosen from transparent materials of ophthalmic grade used in the ophthalmic industry.

To be mentioned as especially preferred classes of substrate materials are polycarbonates, polyamides, polyimides, polysulfones, copolymers of polyethylene therephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company, the corresponding marketed lenses being referred to as ORMA® lenses from ESSILOR), polycarbonates such as those derived from bisphenol A, (meth)acrylic or thio(meth)acrylic polymers and copolymers such as polymethyl methacrylate (PMMA), urethane and thiourethane polymers and copolymers, epoxy polymers and copolymers, episulfide polymers and copolymers.

Prior to depositing coatings, the surface of the substrate is usually submitted to a physical or chemical surface activating and cleaning treatment, so as to improve the adhesion of the layer to be deposited, such as disclosed in WO 2013/013929.

The coating according to the invention is an epoxy coating, resulting from the polymerization of at least one epoxy compound according to the invention, i.e., a compound comprising at least one epoxy group and at least one cycloaliphatic or aryl group and having a specific C/O atom ratio. Said ratio: number of carbon atoms/number of oxygen atoms in the epoxy compound is higher than or equal to 3, preferably higher than or equal to 3.5.

The finding that epoxy compounds according to the invention provide benefits in terms of the photostability of dyes is quite surprising. Epoxy compounds according to the invention can be seen as electron poor epoxy compounds due to their structure and high C/O ratio. Without wishing to by bound by theory, it is believed that electron rich epoxy compounds are responsible for dye photo-degradation and that the coatings according to the invention show lower dye photo-degradation as they contain less polymer chains obtained from electron rich epoxy compounds.

Further, the epoxy compounds according to the invention provide non-polar and electron poor groups/segments in the polymer network, which are compatible with most of absorbing dyes, leading to compositions that provide, upon curing, transparent clear coatings with low haze.

The epoxy compounds according to the invention are cyclic ethers and are preferably epoxides (oxiranes). As used herein, the term epoxide represents a subclass of epoxy compounds containing a saturated three-membered cyclic ether.

The term "aryl" denotes an aromatic carbocyclic radical comprising only one ring (for example a phenyl group) or several, optionally fused, rings (for example naphthyl or terphenyl groups), which may optionally be substituted with one or more groups such as, without limitation, alkyl (for example methyl), hydroxyalkyl, aminoalkyl, hydroxyl, thiol, amino, halo (fluoro, bromo, iodo or chloro), nitro, alkylthio, alkoxy (for example methoxy), aryloxy, monoalkylamino, dialkylamino, acyl, carboxyl, alkoxycarbonyl, aryloxycarbonyl, hydroxysulfonyl, alkoxysulfonyl, aryloxysulfonyl, alkylsulfonyl, alkylsulfinyl, cyano, trifluoromethyl, tetrazolyl, carbamoyl, alkylcarbamoyl or dialkylcarbamoyl groups. Alternatively, two adjacent positions of the aromatic ring may be substituted with a methylenedioxy or ethylenedioxy group.

The term "aryl" also includes "heteroaryl" groups, i.e. aromatic rings in which one or more carbon atoms of the aromatic ring(s) have been replaced with a heteroatom such as nitrogen, oxygen, phosphorus or sulfur.

The term "cycloaliphatic" denotes a saturated or unsaturated but non aromatic carbocyclic radical comprising one or several optionally fused rings, which may optionally be substituted with one or more of the groups cited above for the aryl group. The term "cycloaliphatic" also includes "heterocycloaliphatic" groups, i.e. non-aromatic monocyclic or polycyclic rings in which one or more carbon atoms of the ring(s) have been replaced with a heteroatom such as nitrogen, oxygen, phosphorus or sulfur. The cycloaliphatic group is preferably a cycloalkyl group.

The dry extract of a compound or composition is the total weight of the compound or composition after the full removal of volatile solvent(s) at 100° C. to 110° C. in an oven. The dry extract is also called solids content, percent nonvolatile material by weight or % NVM. Traditional procedures to determine solids take 60 min at 105° C. to 110° C. in an oven, and require both pre- and post weighing of the sample pan and sample (ASTM designations: D2369 and D2926-80). The new procedures using the commercial Mark 3 solids analyzer purchased from Sartorius, or SMART Turbo™ purchased from CEM, take only 2 to 10 minutes, depending on the volatile/moisture content and viscosity of the material.

Also, the dry extract can be theoretically calculated, for example as described in EP614957. The dry extract of epoxies having no hydrolysable groups is their own weight.

The epoxy coating comprises epoxy compounds having at least one cycloaliphatic or aryl group and a C/O ratio higher than or equal to 3 in such an amount that the dry extract weight of those epoxy compounds represents more than 33% of the dry extract weight of the composition, preferably at least 40%, at least 50%, at least 60%, at least 70%, at least 80%, at least 90% or at least 95% of the dry extract weight of the composition.

The composition according to the invention preferably comprises at least 30% by weight of epoxy compounds comprising at least one cycloaliphatic or aryl group and having a C/O ratio ≥3, relative to the total weight of epoxy compounds in the composition, more preferably at least 40%, at least 50%, at least 60%, at least 70%, at least 80%, or at least 90% by weight. In one embodiment, the composition comprises 100% by weight of epoxy compounds according to the invention, i.e., epoxy compounds comprising at least one cycloaliphatic or aryl group and having a C/O ratio ≥3, relative to the total weight of epoxy compounds in the composition.

The dry extract weight of epoxy compounds that do not comprise any silicon atom having at least one hydrolyzable group directly linked to the silicon atom preferably represents more than 45% of the dry extract weight of the composition, more preferably at least 50%, at least 60%, at least 70%, at least 80%, at least 90% or 100% of the dry extract weight of the composition.

The composition according to the invention preferably comprises at least 40% by weight of epoxy compounds that do not comprise any silicon atom having at least one hydrolyzable group directly linked to the silicon atom, relative to the total weight of epoxy compounds in the composition, more preferably at least 45%, at least 50%, at least 60%, at least 70%, at least 80%, at least 90% by weight or 100% by weight.

The epoxy compounds according to the invention preferably comprise at least two epoxy groups. Generally, these compounds contain 2 to 3 epoxy groups per molecule, albeit polyfunctional epoxy compounds containing more than 3 epoxy groups per molecule (generally 4-8) can also be used in addition to or in replacement of epoxy compounds containing 2 to 3 epoxy groups. Preferably, they contain no more than 4, better no more than 3 epoxy groups, and even better are diepoxydes.

In one embodiment, the epoxy compounds according to the invention do not comprise any silicon atom having at least one hydrolyzable group directly linked to the silicon atom. More preferably, epoxy compounds according to the invention do not contain other reactive function than the epoxy group(s), capable of reacting with other polymerizable functions present in the composition and that would be linked to the polymer matrix of the coating. In other words, preferred epoxy compounds are "pure" epoxy compounds.

The epoxy compound according to the invention preferably comprises at least one of a glycidyl ether group (preferably an aryl glycidyl ether group) and a β-(3,4-epoxycyclohexyl)alkyl group such as the β-(3,4-epoxycyclohexyl)methyl and β-(3,4-epoxycyclohexyl)ethyl groups. Glycidyl ethers are synthetic compounds characterized by the following group in which R1 denotes a monovalent group:

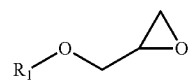

The preferred epoxy compounds comprising at least one cycloaliphatic group preferably comprise at least one group selected from the groups:

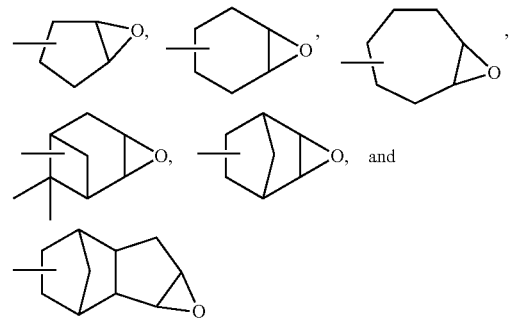

in which the hydrogen atoms in the structures may be substituted by one or more substituents such as those cited above as substituents for an aryl group.

Examples of suitable epoxy compounds, with their trade names and formulae where applicable include 3',4'-epoxycyclohexylmethyl-3,4-epoxycyclohexane carboxylate (C/O=3.5, Uvacure® 1500 from UCB Chemicals, Cyracure® UVR-6110 and UVR® 6105 from Union Carbide, formula Xq), bis (2,3-epoxy cyclopentyl) ether (C/O=3.3, formula Xr), bis (3,4-epoxycyclohexylmethyl) adipate (C/O=3.3, UVR-6128 from Dow Chemical Company, formula Xd), vinyl cyclohexene dioxide (3-(oxiran-2-yl)-7-oxabicyclo[4.1.0]heptane, C/O=4, formula Xs), limonene diepoxide (6-methyl-3-(2-methyloxiran-2-yl)-7-oxabicyclo[4.1.0]heptane, C/O=5, Celloxide 3000 from Daicel Chemical Industries Ltd., formula Xv), 1,1,1-tris-(p-hydroxyphenyl) methane triglycidyl ether (C/O=4.7, Tactix 742 from Ciba, formula Xt), 1,1,1-tris-(p-hydroxy phenyl) ethane triglycidyl ether (C/O=4.8, EPALLOY® 9000 from CVC Specialty Chemicals, formula Xg), glycidyl ethers of the condensation products of dicyclopentadiene and phenol (formula Xy hereunder where n is an integer generally ranging from 0 to 25, C/O~9.5, Tactix 556 from Ciba), tetrakis (4-hydroxyphenyl) ethane tetraglycidyl ether (C/O=4.8, Epon 1031 from Shell Chemical, formula Xp), epoxy phenol novolacs such as the resin of formula Xw hereunder, where n is an integer denoting the number of polymerized subunits and is typically in the range from 0 to 25 (C/O=5, Epon 155, 160, 861, 862 from Shell Chemical or Epalloy® 8230, 8240, 8250, 8330, 8350 from CVC Specialty Chemicals), epoxy cresol novolacs such as the resin of formula X1 hereunder, where n is an integer denoting the number of polymerized subunits and is typically in the range from 0 to 25 (C/O~5.5, Epon 164, RSS-2350 from Shell Chemical or Araldite ECN 1235, 1871, 9699 from Ciba), epoxy bisphenol A novolacs such as the resin of formula Xu hereunder, where n is an integer denoting the number of polymerized subunits and is typically in the range from 0 to 25 (C/O=5.4-5.5, SU resin from Shell Chemical), bisphenol A diglycidyl ether (C/O=5.75, formula Xi), hydrogenated bisphenol A diglycidyl ether (C/O=5.75, Epalloy® 5000 from CVC Specialty Chemicals, formula Xh), bisphenol A diglycidyl ether resins (C/O~6, n generally ranging from 0 to 25, Epon 828 from Shell Chemical, formula Xe), resorcinol diglycidyl ether (C/O=3.5, formula Xj), epoxycyclohexyl POSS® Cage Mixture (C/O=3.2, EP0408 from Hybrid Plastics, formula Xo), derivatives of hexahydrophthalic anhydride diglycidyl ester of formulae Xx and X2 (C/O=3), 4-glycidyloxy-N,N-diglycidyl aniline (C/O=3.75, formula Xf), 4,4'-(hexafluoroisopropylidene)diphenol diglycidyl ether (C/O=5.3, formula Xc), 1,3-bis[2-(3,4-epoxycyclohexyl)ethyl] tetramethyldisiloxane (C/O=5.3, SIB1092.0 from Gelest, formula Xa), the 2-(3,4-epoxycyclohexyl)ethyl compound of formula Xb (C/O=4, available from Gelest), resorcinol di(3,4-epoxycyclohexylmethyl) ether (C/O=5, formula Xn), and the aromatic epoxy compounds of formulae Xk, Xz, Xl, Xm (respective C/O=3.5, 3.75, 5, 7). The compounds corresponding to the formulae cited in this paragraph are represented hereunder:

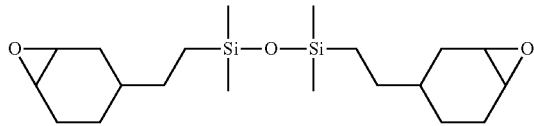

Xa

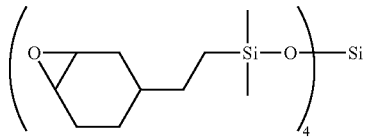

Xb

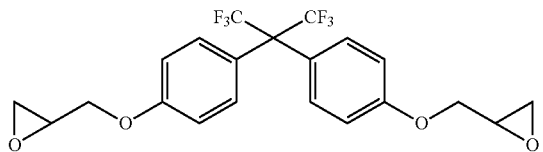

Xc

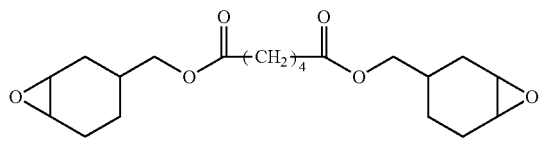

Xd

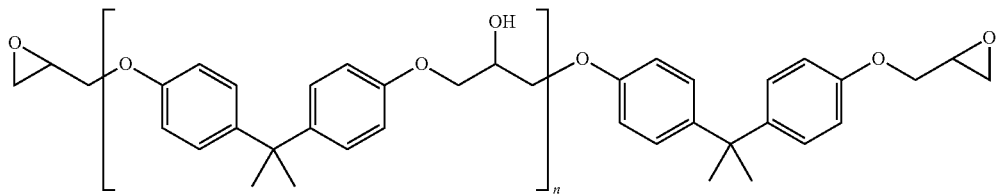

Xe

-continued
Xf
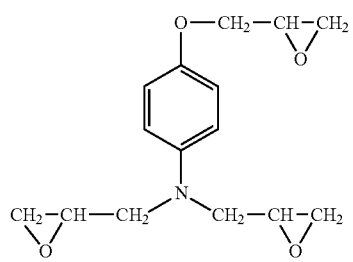
Xg
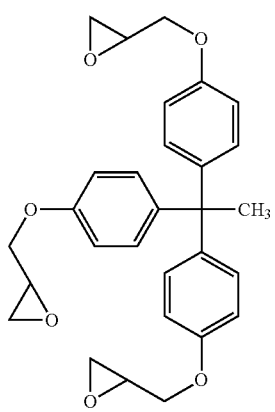
Xh
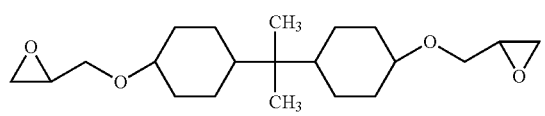
Xi
Xj
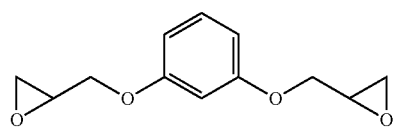
Xk
Xl
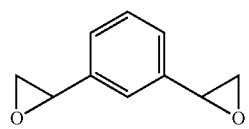
Xm
Xn
Xo
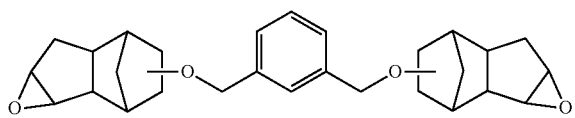

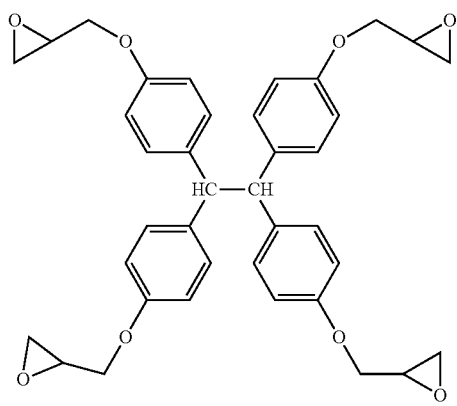 Xp
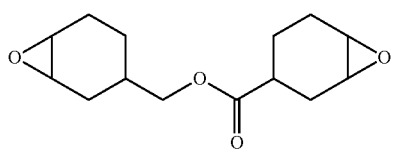 Xq
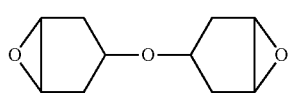 Xr
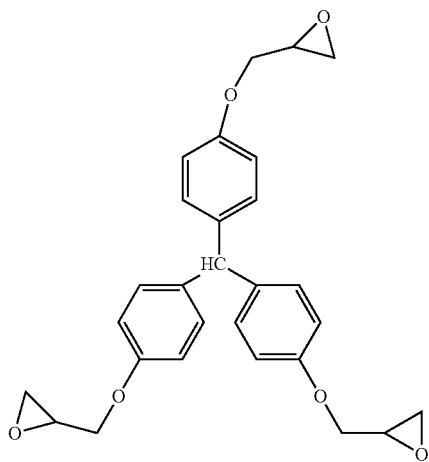 Xt
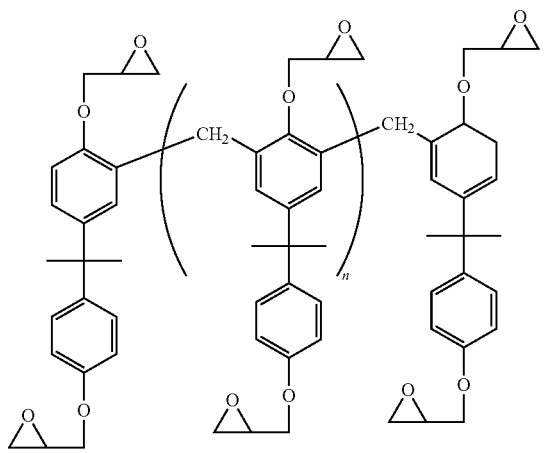 Xu
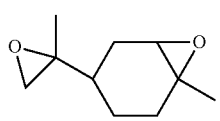 Xv
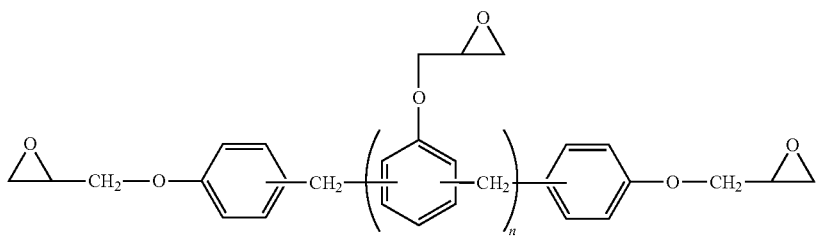 Xw
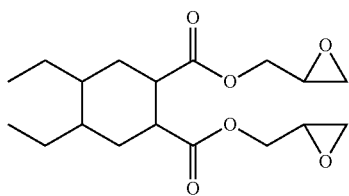 Xx -continued

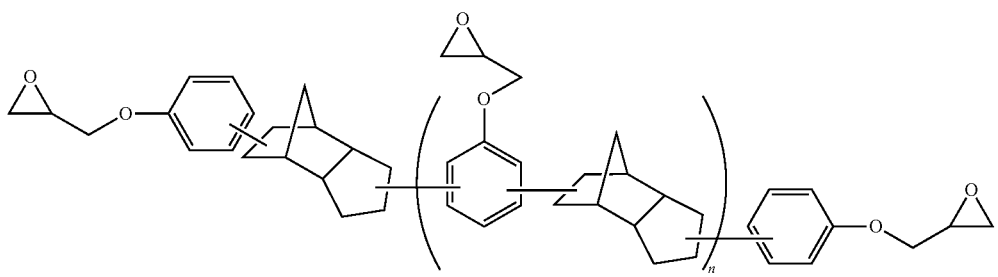
Xy

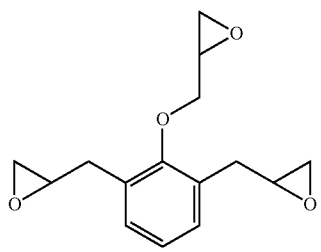
Xz

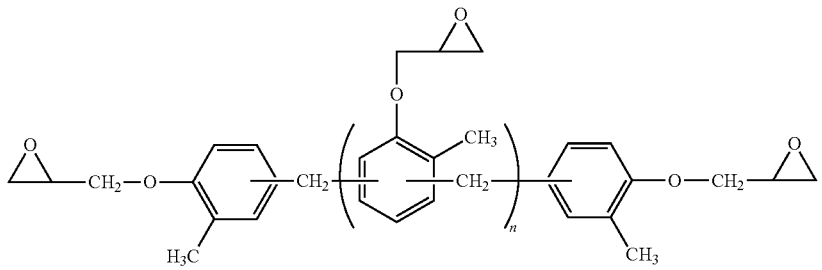
X1

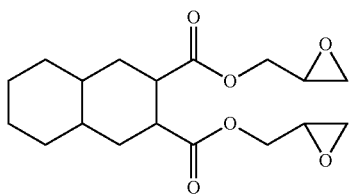
X2

The composition according to the invention preferably comprises less than 25% by weight relative to the total weight of the composition, more preferably less than 20% by weight, of acrylic and/or methacrylic monomers, and more preferably of non-epoxy containing monomers. This amount can be less than 10% or less than 5% by weight and even 0%.

The dry extract weight of acrylic and/or methacrylic monomers preferably represents less than 30% of the dry extract weight of the composition, more preferably less than 25%, 20%, 10%, 5%. This amount can also be 0%. These amounts also preferably apply to non-epoxy containing monomers.

The compositions of the present invention advantageously further contain small amounts, preferably from 0.005 to 1% by weight, based on the total weight of the composition, of at least one surface active compound (surfactant), more preferably from 0.02 to 1%, still more preferably from 0.025 to 0.5%. The surfactant is important for good wetting of the substrate resulting in satisfactory cosmetics of the final coating. Said surfactant can include for example poly(alkylene glycol)-modified polydimethylsiloxanes or polyheptamethylsiloxanes, or fluorocarbon-modified polysiloxanes. Preferred surfactants are fluorinated surfactant such as Novec® FC-4434 from 3M (non ionic surfactant) and EFKA® 3034 from CIBA (fluorocarbon-modified polysiloxanes).

The epoxy compounds of the composition are submitted to a polycondensation and/or cross-linking reaction generally in the presence of a catalyst.

The catalysts found to be able to cure the epoxy composition at temperatures low enough not to damage the underlying substrate or cause adverse affects to the dye or other coatings are strong acid catalysts designed for ring opening polymerization of cyclic ether groups. In order to obtain storage-stable curable composition, the catalyst, of course, should not catalyze the ring-opening at room temperature. Such blocked or latent catalysts that are inactive at ambient temperature and activated only upon heating, generally at least 80° C., are familiar to the skilled person. Exemplary blocked strong acid catalysts are based on trifluoromethanesulfonic acid (triflic acid), dinonylnaphthalene sulfonic acid, dinonylnaphthalene disulfonic acid (DNNDSA), and ammonium antimony hexafluoride (a Lewis acid) and are available from King Industries for example Nacure® Super A233 (diethylamine salt of trifluoromethanesulfonic acid), Nacure® 155 (a blocked acid catalyst based on DNNDSA), Nacure® Super XC-7231 (ammonium antimony hexafluoride catalyst), and Nacure® Super-A218 (metal salt of triflic acid, Lewis acid), the latter being the preferred catalyst. Other useful catalysts include carboxylic acid anhydrides such as hexahydrophthalic anhydride, methylhexahydrophthalic anhydride, or Lewis acid catalysts including $BF_3$ and $BCl_3$ amine complexes.

The catalyst is generally used in amounts ranging from 0.01-5% by weight based on the weight of the composition, preferably from 0.1 to 3% by weight. The dry extract weight of catalyst preferably represents from 0.025-12.5% of the dry extract weight of the composition, preferably from 0.25 to 7.5%.

The composition according to the invention generally contains 10-80% by weight of solids (dry extract weight of the composition), preferably from 25 to 60%, more preferably from 35 to 55%.

The composition generally contains at least one solvent, which is preferably a glycol monoether. The glycol monoether solvent generally exhibits low surface tensions and is preferably selected from alkylene glycol C1-4 alkyl monoethers, more preferably from ethylene glycol C1-4 alkyl monoethers, propylene glycol C1-4 alkyl monoethers, diethylene glycol C1-4 alkyl monoethers, triethylene glycol C1-4 alkyl monoethers, propylene glycol C1-4 alkyl monoethers, dipropylene glycol C1-4 alkyl monoethers, triethylene glycol C1-4 alkyl monoethers, and tripropylene glycol C1-4 alkyl monoethers. The most preferred glycol monoether is propylene glycol methyl ether. Such a compound is sold commercially by Dow Chemical under the name Dowanol PM® as a mixture of 1-methoxy-2-propanol (major isomer) and 2-methoxy-1-propanol. Additional or alternative solvents can be used, such as alkanols (methanol, ethanol, propanol . . . ), ketones or water.

The total amount of solvent depends on the epoxy resins used, on the type of optical article and on the coating process. The purpose of the solvent is to achieve good surface wetting and a specific coating viscosity range determined by the coating equipment used to achieve a specific coating thickness range. The solvent typically represents from 25 to 75% of the weight of the composition, preferably from 35 to 65%, more preferably from 40 to 60%.

It is possible to add to the composition additional polymerizable epoxy compounds that are not epoxy compounds according to the invention without significantly affecting the dye photo-degradation level in the final coating, provided that the dry extract weight of epoxy compounds according to the invention still represents more than 33% of the dry extract weight of the composition.

These additional compounds can be epoxy compounds that neither comprise any cycloaliphatic or aryl group nor any silicon atom having at least one hydrolyzable group directly linked to the silicon atom, such as, without limitation to these compounds, trimethylolpropane triglycidyl ether (Erisys™ GE-30, from CVC thermoset Specialties), sorbitol hexaglycidyl ether (Erisys™ GE-60, from CVC thermoset Specialties) or ethylene glycol diglycydyl ether. These additional compounds can also be epoxy compounds comprising at least one cycloaliphatic or aryl group, devoid of any silicon atom having at least one hydrolyzable group directly linked to the silicon atom, and with a C/O ratio lower than 3, such as hexahydrophthalic anhydride diglycidyl ester (C/O=2.3, CY® 184 from Ciba).

These additional epoxy comonomers can also be epoxy compounds bearing at least one silicon atom having at least one hydrolyzable group directly linked to the silicon atom and at least one group comprising an epoxy function linked to the silicon atom through a carbon atom that either do not comprise any cycloaliphatic or aryl group or do not have a C/O ratio ≥3, or hydrolyzates of such compounds. In this embodiment, hybrid epoxy copolymers will be generated if epoxy compounds according to the invention and devoid of reactive silicon atom are used together with these organosilanes.

Such organosilane compounds preferably have from 2 to 6, more preferably 2 or 3 functional groups generating a silanol group under hydrolysis. They are preferably epoxysilanes of formula:

wherein the R groups, identical or different, are monovalent organic groups linked to the Si atom by a carbon atom and comprising at least one, preferably one epoxy function; the X groups, identical or different, are hydrolyzable groups (such as alkoxy groups or halogen atoms); Y is a monovalent organic group that does not contain an epoxy group and which is linked to the Si atom by a carbon atom, n and m being integers such as n=1 or 2 and n+m=1 or 2. Hydrogen atoms and hydroxyl groups are considered as being hydrolyzable groups in the present disclosure.

The preferred R groups have the following formulae V and VI:

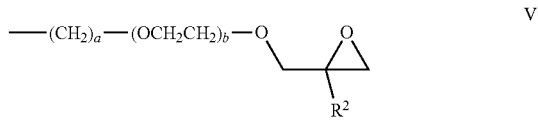

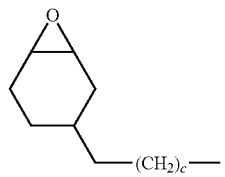

wherein $R^2$ is an alkyl group, preferably a methyl group or a hydrogen atom, more preferably a hydrogen atom; a and c are integers ranging from 1 to 6 and b is representing 0, 1 or 2. In formula VI, c is preferably 1, giving rise to a β-(3,4-epoxycyclohexyl)ethyl group. Most preferred epoxysilanes are those wherein, in formula I, n=1, m=0 and X is a C1-C5 alkoxy group, preferably $OCH_3$.

Examples of such epoxysilanes include γ-glycidoxypropyl triethoxysilane, γ-glycidoxypropyl trimethoxysilane, 2-(3,4-epoxycyclohexyl) ethyltrimethoxysilane, 3-glycidoxypropyl methyldiethoxysilane, 2-(3,4-epoxycyclohexyl) ethyltriethoxysilane. Other suitable examples of such compounds are compounds of formula I disclosed in US 2009/0311518, compounds of formulae I, VII and VIII disclosed in US 2011/0058142, and the epoxytrialkoxysilanes disclosed in U.S. Pat. No. 4,294,950. Amongst them, γ-glycidoxypropyl trimethoxysilane (GLYMO) is the most preferred.

According to one aspect of this invention, the epoxysilane is hydrolyzed before being mixed to the other components of the composition. The hydrolysis may be performed as known in the art, by using acidic catalysts (hydrochloric acid, acetic acid . . . ), in the presence of water.

Organosilanes having at least one epoxy group linked to the silicon atom through a carbon atom and bearing at least one silicon atom having at least one hydrolyzable group directly linked to the silicon atom are preferably used in an amount of less than 30% by weight relative to the total weight of the composition, more preferably less than 20% by weight. This amount can be less than 10% or less than 5% by weight and even 0%. Despite the epoxysilane is generally under hydrolyzed form, the amount of epoxysilane will be conventionally defined as the weight of the initial precursor before its hydrolysis.

The dry extract weight of organosilanes having at least one epoxy group linked to the silicon atom through a carbon atom and bearing at least one silicon atom having at least one hydrolyzable group directly linked to the silicon atom preferably represents less than 40% of the dry extract weight of the composition, more preferably less than 30%, 20%, 10%, 5%. This amount can also be 0%.

Epoxy compounds that do not comprise any silicon atom having at least one hydrolyzable group directly linked to the silicon atom and either do not comprise any cycloaliphatic or aryl group or exhibit a C/O ratio lower than 3 are preferably used in an amount of less than 20% by weight relative to the total weight of the composition, more preferably less than 15% by weight. This amount can be less than 10% or less than 5% by weight and even 0%. Their dry extract weight preferably represents less than 30% of the dry extract weight of the composition, more preferably less than 20%, 15%, 10%, 5%. This amount can also be 0%.

The composition can also include at least one compound, or a hydrolyzate thereof, of formula $M(Z)_y$, wherein M represents a metal or a metalloid, preferably Si, the Z groups, being the same or different, are hydrolyzable groups and y, equal to or higher than 4, is the metal or metalloid M valence. Such compounds are described in detail in US 2011/0058142. The preferred compounds are compounds of formula $Si(Z)_4$, wherein the Z groups, being the same or different, are hydrolyzable groups, such as tetraethoxysilane.

The composition can further include fillers such as oxides of metals or metalloids, for example silica, preferably used under a colloidal form, and various additives such as curing/cross-linking agents (e.g. silane coupling agents or comonomers such as polyamines, polythiols, polyols, polycarboxylic acids), rheology modifiers, flow and leveling additives, wetting agents, antifoaming agents, stabilizers, and color balancing agents. The composition can be a solution or a dispersion. The color balancing agents can be powders, solutions or dispersions in which dye(s) or pigment(s) are used to adjust the final article into specific colors, particularly neutral colors.

According to the invention, the coating composition comprises at least one dye that at least partially inhibits transmission of light within the visible blue light range (400-500 nm) and has a conjugated chromophore, i.e., a chromophore comprising a conjugated system. As used herein a chromophore refers to the part of a dye molecule, generally a group of atoms, which is responsible for the dye's color, and a dye may refer to both a pigment and a colorant, i.e., can be insoluble or soluble in its vehicle.

In the present disclosure, the dye will be referred to as a blue light blocking dye and is typically a yellow dye. The chemical nature of this dye is not particularly limited, provided that it has an absorption peak, ideally a maximum absorption peak, within the 380-780 nm wavelength range. The FWHM (Full Width at Half Maximum) is preferably lower than 80 nm, more preferably lower than 60 nm, even more preferably lower than 60 nm. The dyes are selected and processed in a way such that they are compatible with the epoxy monomers according to the invention, and well and stably distributed or dispersed in the matrix of the coating, providing low haze coatings.

The optical article inhibits transmission of incident light through at least one geometrically defined surface of the substrate of the optical article, preferably an entire main surface. In the present description, unless otherwise specified, light blocking is defined with reference to an angle of incidence ranging from 0° to 15°, preferably 0°.

The dye preferably at least partially inhibits transmission of light within the 415-455 nm wavelength range, by absorption more preferably within the 420-450 nm range, in order to provide a high level of retinal cell protection against retinal cell apoptosis or age-related macular degeneration.

It may be particularly desirable in some cases to selectively filter a relatively small portion of the blue spectrum, i.e., the 420 nm-450 nm region. Indeed, blocking too much of the blue spectrum can interfere with scotopic vision and mechanisms for regulating biorhythms, referred to as "circadian cycles". Thus, in one embodiment, the preferred dye blocks less than 10%, preferably less than 5% of light having a wavelength ranging from 465 to 495 nm, preferably from 450 to 550 nm. In this embodiment, the dye selectively inhibits the phototoxic blue light and transmits the blue light implicated in circadian rhythms. Preferably, the optical article transmits at least 95% of light having a wavelength ranging from 465 to 495 nm. This transmittance is an average of light transmitted within the 465-495 nm range that is not weighted according to the sensitivity of the eye at each wavelength of the range. In another embodiment, the dye does not absorb light in the 465-495 nm range, preferably the 450-550 nm range. In the present description, unless otherwise specified, transmittances/transmissions are measured at the center of the optical article for a thickness ranging from 0.5 to 2.5 mm, preferably 0.7 to 2 mm, more preferably 0.8 to 1.5 mm, at an angle of incidence ranging from 0° to 15°, preferably 0°.

When the dye is a dye that absorbs within the 400-500 nm wavelength range, the dye does preferably not absorb, or very little, in regions of the visible spectrum outside the 400-500 nm wavelength range to minimize the appearance of a plurality of colors. In this case, the dye selectively inhibits transmission of light within the 400-500 nm wavelength range, preferably in the 415-455 nm and 420-450 nm ranges. As used herein, a dye "selectively inhibits" a wavelength range if it inhibits at least some transmission within the specified range, while having little or no effect on transmission of wavelengths outside the selected wavelength range, unless specifically configured to do so.

In certain embodiments, the dye comprises one or more porphyrins, porphyrin complexes, other heterocycles related to porphyrins, including corrins, chlorins and corphins, derivatives thereof, or the perylene, coumarin, acridine, indolenin (also known as 3H-indole), anthraquinone, azobenzene, phthalocyanine, cyanines, quinoline, benzotriazole, nitrobenzene, isoquinoline, isoindoline, diarylmethane and indol-2-ylidene families. Derivatives are substances generally issued by an addition or substitution. The preferred dyes are diarylmethane dyes such as auramine O and porphyrin dyes.

Porphyrins are well-known macrocycle compounds composed of four modified pyrrole subunits interconnected at their carbon atoms via methine bridges. The parent porphyrin is porphine and substituted porphines are called porphyrins. Porphyrins are the conjugate acids of ligands that bind metals to form (coordination) complexes.

Certain porphyrins or porphyrin complexes or derivatives are interesting in that they provide selective absorption filters having a bandwidth in some cases of for example 20 nm in the selected blue range of wavelengths. The selectivity property is in part provided by the symmetry of the molecules. Such selectivity helps to limit the distortion of the visual perception of color, to limit the detrimental effects of light filtering to scotopic vision and to limit the impact on circadian rhythm.

For example, the one or more porphyrins or porphyrin complexes or derivatives are selected from the group consisting of Chlorophyll a; Chlorophyll b; 5,10, 15,20-tetrakis (4-sulfonatophenyl) porphyrin sodium salt complex; 5,10, 15,20-tetrakis(N-alkyl-4-pyridyl) porphyrin complex; 5,10, 15,20-tetrakis(N-alkyl-3-pyridyl) porphyrin complex, and 5,10,15,20-tetrakis(N-alkyl-2-pyridyl) porphyrin complex, the alkyl being preferably an alkyl chain, linear or branched, comprising 1 to 4 carbon atoms per chain. For example the alkyl may be selected from the group consisting of methyl, ethyl, butyl and propyl.

The complex usually is a metal complex, the metal being selected from the group consisting of Cr(III), Ag(II), In(III), Mn(III), Sn(IV), Fe (III), Co (II), Mg(II) and Zn(II). Cr(III), Ag(II), In(III), Mn(III), Sn(IV), Fe(III), Co(II) and Zn(II) demonstrate absorption in water in the range of 425 nm to 448 nm with sharp absorption peaks. Moreover, the complexes they provide are stable and not acid sensitive. Cr(III), Ag(II), In(III), Sn(IV), Fe(III), in particular, do not exhibit fluorescence at room temperature which is a useful property in optical lenses such as ophthalmic lenses.

In some embodiments the one or more porphyrins or porphyrin complexes or derivatives are selected from the group consisting of magnesium meso-tetra(4-sulfonatophenyl) porphine tetrasodium salt, magnesium octaethylporphyrin, magnesium tetramesitylporphyrin, octaethylporphyrin, tetrakis (2,6-dichlorophenyl) porphyrin, tetrakis (o-aminophenyl) porphyrin, tetramesitylporphyrin, tetraphenylporphyrin, zinc octaethylporphyrin, zinc tetramesitylporphyrin, zinc tetraphenylporphyrin, and diprotonated-tetraphenylporphyrin.

The dye may also include one or more dyes from the group consisting of: coumarin 343; coumarin 314; nitrobenzoxadiazole; lucifer yellow CH; 9,10-bis(phenylethynyl) anthracene; proflavin; 4-(dicyanomethylene)-2-methyl-6-(4-dimethyl aminostyryl)-4H-pyran; 2-[4-(dimethylamino) styryl]-1-methypyridinium iodide, lutein, zeaxanthin, and yellow dyes having a narrow absorption peak available from Exciton Inc. such as ABS-419®, ABS-420® or ABS-430®.

The amount of dye used in the present invention is an amount sufficient to provide a satisfactory inhibition of light within the 380-780 nm wavelength range, preferably within the 400-500 nm wavelength range. For example the dye can be used at a level of 0.005 to 0.50% or 0.01 to 0.2% based on the weight of the coating composition, depending on the strength of the dye and the amount of inhibition/protection desired. It should be understood that the invention is not limited to these ranges, which are only given by way of example.

The dye is typically present in an amount ranging from 0.005 to 1.25% relative to the dry extract weight of the composition, preferably from 0.01 to 1%, more preferably from 0.02 to 0.5%.

The coating composition of the invention provides a coating that limits or avoids the photo-degradation of dyes that are generally sensitive to light, in particular UV light, without the need to include UV absorbers and/or free radical scavengers in the coating composition, in another layer or in the substrate, and without the need to use another coating protecting the dye from photo-degradation such as an interferential filter absorbing or reflecting UV light or acting as an oxygen barrier protection.

In one embodiment of the invention, the coating composition/the coating comprises less than 0.5% by weight of compounds selected from UV absorbers and free radical scavengers relative to the coating composition/coating total weight, preferably less than 0.2% by weight, more preferably less than 0.1% by weight. In some instances, the composition neither comprises any UV absorber nor free radical scavenger.

However, the coating composition can also comprise at least one UV absorber and/or at least one free radical scavenger in order to further limit or even eliminate photo-degradation of the dye contained therein. These species can also be incorporated into another coating present at the surface of the optical article coated with the inventive epoxy coating.

UV absorbers are frequently incorporated in optical articles in order to reduce or prevent UV light from reaching the retina (in particular in ophthalmic lens materials), but also to protect the substrate material itself, thus preventing it from weathering and becoming brittle and/or yellow.

The UV spectrum has many bands, especially UVA, UVB and UVC bands. Amongst those UV bands reaching the earth surface, UVA band-ranging from 315 nm to 380 nm, and UVB band-ranging from 280 nm to 315 nm are particularly harmful to the retina.

The UV absorber that may be used in the present invention preferably has the ability to at least partially block light having a wavelength shorter than 400 nm, preferably UV wavelengths below 385 or 390 nm.

Most preferred ultraviolet absorbers have a maximum absorption peak in a range from 350 nm to 370 nm and/or do not absorb light in the 465-495 nm range, preferably the 450-550 nm range, and/or have an absorption spectrum extending to a selected wavelength range within the 400-500 nm region of the electromagnetic spectrum. In one embodiment, the UV absorber does not absorb any substantial amount of visible light.

Suitable UV absorbers include without limitation substituted benzophenones such as 2-hydroxybenzophenone, substituted 2-hydroxybenzophenones disclosed in U.S. Pat. No. 4,304,895, 2-hydroxy-4-octyloxybenzophenone (Seesorb 102®) 2,7-bis(5-methylbenzoxazol-2-yl)-9,9-dipropyl-3-hydroxyfluorene, 1,4-bis(9,9-dipropyl-9H-fluoreno [3,2-d] oxazol-2-yl)-2-hydroxyphenyl, 2-hydroxyphenyl-s-triazines and benzotriazoles compounds.

The UV absorber is preferably a benzotriazole compound. Suitable UV absorbers from this family include without limitation 2-(2-hydroxyphenyl)-benzotriazoles such as 2-(2-hydroxy-3-t-butyl-5-methylphenyl) chlorobenzotriazole, 2-(2'-hydroxy-5'-t-octylphenyl) benzotriazole, 2-(3'-methallyl-2'-hydroxy-5'-methyl phenyl) benzotriazole or other allyl hydroxymethylphenyl benzotriazoles, 2-(2-hydroxy-5-methylphenyl)-2H-benzotriazole (Seesorb®701), 2-(3,5-di-t-amyl-2-hydroxyphenyl) benzotriazole, and the 2-hydroxy-5-acryloxyphenyl-2H-benzotriazoles disclosed in U.S. Pat. No. 4,528,311. Preferred absorbers are of the benzotriazole family. Commercially available products include Tinuvin® and Chimassorb® compounds from BASF such as Tinuvin® 326, Seeseorb® 701 and 703 from Shipro Kasei Kaisha, Viosorb 550® from Kyodo Chemicals, and Kemisorb 73® from Chemipro and TCP Tinuvin Carbo Protect from BASF.

The UV absorber is preferably used in an amount representing from 0.3 to 2% of the weight of the coating.

In some embodiments, the coating composition comprises at least one free radical scavenger. Free radical scavengers inhibit the formation of or scavenge the presence of free radicals, and include hindered amine light stabilizers (HALS), which protect against photo-degradation, and antioxidants, which protect against thermal oxidation.

Preferably, the coating composition comprises at least one hindered amine light stabilizer, and/or at least one antioxidant, more preferably at least one hindered amine light stabilizer and at least one antioxidant. This combination of free radical scavengers offers the best protection from thermal and photo degradation to dyes.

In one embodiment, the free radical scavenger is a sterically hindered phenol or amine.

Preferred hindered amine light stabilizers are derivatives of piperidine, such as derivatives of 2,2,6,6-tetramethyl piperidine. They are commercially available from BASF under the trade names Tinuvin® and Chimassorb®.

Preferred antioxidants are sterically hindered phenols, thioethers or phosphites. They are commercially available from BASF under the trade names Irganox® and Irgafos®.

The amount of free radical scavenger that is used is an amount that is effective to stabilize the composition, which will depend on the specific compounds chosen and can be easily adapted by those skilled in the art.

Protection of dyes from photo-degradation can also be reinforced by the presence on the optical article of at least one mineral/dielectric layer, preferably at least one mineral layer of an antireflection coating.

In this regard, the substrate's main surface can be further coated with several functional coating(s) to improve its optical and/or mechanical properties. The term "coating" is understood to mean any layer, layer stack or film which may be in contact with the substrate and/or with another coating, for example a sol-gel coating or a coating made of an organic resin. A coating may be deposited or formed through various methods, including wet processing, gaseous processing, and film transfer. The functional coatings used herein can be selected from, without limitation to these coatings, an impact-resistant coating, an abrasion-resistant and/or scratch-resistant coating, an antireflection coating, a polarized coating, a photochromic coating, an antistatic coating, an anti-fouling coating (hydrophobic and/or oleophobic coating), an antifog coating, a precursor of an antifog coating or a stack made of two or more such coatings.

The primer coatings improving the impact resistance and/or the adhesion of the further layers in the end product are preferably polyurethane latexes or acrylic latexes. Primer coatings and abrasion-resistant and/or scratch-resistant coatings may be selected from those described in the application WO 2007/088312.

Abrasion- and/or scratch-resistant coatings (hard coatings) are preferably hard coatings based on poly(meth) acrylates or silanes. Recommended hard abrasion- and/or scratch-resistant coatings in the present invention include coatings obtained from silane hydrolyzate-based compositions (sol-gel process), in particular epoxysilane hydrolyzate-based compositions such as those described in the US patent application US 2003/0165698 and in U.S. Pat. No. 4,211,823 and EP614957.

The antireflection coating may be any antireflection coating traditionally used in the optics field, particularly ophthalmic optics. An antireflective coating is defined as a coating, deposited onto the surface of an optical article, which improves the antireflective properties of the final optical article. It makes it possible to reduce the light reflection at the article-air interface over a relatively large portion of the visible spectrum.

As is also well known, antireflection coatings traditionally comprise a monolayered or a multilayered stack composed of dielectric materials (generally one or more metal oxides) and/or sol-gel materials and/or organic/inorganic layers such as disclosed in WO 2013/098531. These are preferably multilayered coatings, comprising layers with a high refractive index (HI) and layers with a low refractive index (LI).

In some aspects, the present invention provides an optical article further comprising a sub-layer, deposited before the antireflective coating, said sub-layer having preferably a refractive index lower than or equal to 1.55. Unless otherwise specified, the refractive indexes referred to in the present invention are expressed at 25° C. at a wavelength of 550 nm. The sub-layer is generally less than 0.5 micrometer thick and more than 100 nm thick, preferably more than 150 nm thick, more preferably the thickness of the sub-layer ranges from 150 nm to 450 nm. In another embodiment, the sub-layer comprises, more preferably consists in, silicon oxide, even better silica. Examples of usable sub-layers (mono or multilayered) are described in WO 2012/076174.

In some embodiments, the antireflective coating of the invention includes at least one electrically conductive layer. In a particular embodiment, the at least one electrically conductive layer has a refractive index greater than 1.55. The at least one electrically conductive layer serves as an antistatic agent. Without being bound by theory, the at least one electrically conductive layer prevents the multilayer antireflective coating stack from developing and retaining a static electric charge. The electrically conductive layer is preferably made from an electrically conductive and highly transparent material. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. In another embodiment, the preferred electrically conductive and optically transparent layer is a tin-indium oxide layer (ITO) or a tin oxide layer.

More details concerning the constitution and location of the antistatic layer can be found in the applications WO 2012/076714 and WO 2010/109154.

The structure and preparation of antireflection coatings are described in more details in patent application WO 2010/109154, WO 2011/080472 and WO 2012/153072.

The antifouling top coat is preferably deposited onto the outer layer of the antireflective coating. As a rule, its thickness is lower than or equal to 10 nm, does preferably range from 1 to 10 nm, more preferably from 1 to 5 nm. Antifouling top coats are generally coatings of the fluorosilane or fluorosilazane type. They may be obtained by depositing a fluorosilane or fluorosilazane precursor, comprising preferably at least two hydrolysable groups per molecule. Fluorosilane precursors preferably comprise fluoropolyether moieties and more preferably perfluoropolyether moieties.

Optool DSX™, KY130™, OF210™, Aulon™ are examples of hydrophobic and/or oleophobic coatings. More detailed information on these coatings is disclosed in WO 2012076714.

Coatings such as primers, hard coats, antireflection coatings and antifouling coatings may be deposited using methods known in the art, including spin-coating, dip-coating, spray-coating, evaporation under vacuum, sputtering, chemical vapor deposition and lamination.

In one embodiment, the optical article of the invention is preferably configured to reduce reflection in the UVA- and UVB-radiation range, in addition to reducing transmission of light in the 380-780 nm wavelength range (preferably the 400-500 nm range), so as to allow the best health protection against UV and harmful blue light.

The UV radiation resulting from light sources located behind the wearer may reflect on the lens rear face and reach the wearer's eye if the lens is not provided with an antireflective coating which is efficient in the ultraviolet region, thus potentially affecting the wearer's health. In this regard, the optical article preferably comprises on its rear main face, and optionally on its front main face, an anti-UV, antireflective coating possessing very good antireflective performances in the visible region, and which is at the same time capable of significantly reducing the UV radiation reflection, especially ultraviolet A- and ultraviolet B-rays, as compared to a bare substrate or to a substrate comprising a traditional antireflective coating. Suitable anti-UV, antireflective coatings are disclosed in WO 2012/076714.

The optical article according to the invention preferably has a relative light transmission factor in the visible spectrum Tv higher than or equal to 85 or 87%, preferably higher than or equal to 90%, more preferably higher than or equal to 92%, and better higher than or equal to 95%. Said Tv factor preferably ranges from 87% to 98.5%, more preferably from 88% to 97%, even better from 90% to 96%. The Tv factor, also called "luminous transmission" of the system, is such as defined in the standard NF EN 1836 and relates to an average in the 380-780 nm wavelength range that is weighted according to the sensitivity of the eye at each wavelength of the range and measured under D65 illumination conditions (daylight).

The invention also relates to a process to manufacture an optical article such as herein described, comprising providing a substrate, depositing on at least one main surface of said substrate a composition according to the invention including at least one dye that at least partially blocks transmission of light within the 380-780 nm wavelength range, preferably within the 400-500 nm wavelength range, and curing said composition.

The epoxy coating of the invention is deposited on the substrate of the optical article and is preferably in direct contact with said substrate. The deposition is preferably carried out by spin coating or dip coating, and more preferably by dip coating into a bath containing the curable composition.

The composition according to the invention is generally a heat-curable composition.

Curing the composition can be performed in two steps, a first pre-curing step to a temperature of at least 75° C., preferably of 80° C. to 100° C., for at least 5 minutes, generally from 10 to 25 minutes, so as to form a tack-free coating, and a second step of heating the optical article coated with the tack-free coating to a temperature of at least 95° C., preferably of 98 to 115° C., for at least two hours, preferably for 2.5 to 3.5 hours, so as to obtain a completely cured insoluble coating. The temperature of the first curing step depends on the blocked catalyst used. In case the catalyst activation temperature is higher than 80° C., the optical article must be heated to a higher temperature. The heating temperature of the second curing step preferably does not exceed 115° C., or 110° C. Higher temperatures could be harmful to the dye.

The thickness of the cured coating may be adapted to the specific application required and generally ranges from 0.5 to 50 µm, preferably from 1 to 20 µm, more preferably from 2 to 10 µm. The coating thickness can be easily adjusted by modifying the withdrawal speed in case of deposition by dip coating. The longer the withdrawal time, the thinner will be the final dry coating.

In one embodiment, the process comprises forming on the substrate the epoxy coating according to the invention, an impact-resistant coating, an abrasion-resistant and/or scratch-resistant coating, an antireflection coating and an antifouling coating.

The coatings are preferably directly deposited on one another. These coatings can be deposited one by one, or a stack of one or more coatings can be formed on the substrate, for example by lamination.

In one embodiment, the present optical article is prepared by forming on the substrate the epoxy coating in a first manufacturing site, while the other coatings are formed in a second manufacturing site.

The following examples illustrate the present invention in a more detailed, but non-limiting manner. Unless stated otherwise, all thicknesses disclosed in the present application relate to physical thicknesses. The percentages given in the tables are weight percentages.

EXAMPLES

The optical articles used in the examples comprise an ORMA® lens substrate from ESSILOR, having a 65 mm diameter, a refractive index of 1.50, a power of −2.00 diopters and a thickness of 1.2 mm.

Various epoxy coating compositions were prepared and are shown in the tables below. Some of them were compositions of epoxy homopolymers (examples 1, 2 and comparative examples C1-C2), while the others were compositions of epoxy copolymers. The compositions comprise at least one epoxy compound that is not a silicon compound having at least one hydrolyzable group directly linked to the silicon atom, a Lewis acid polymerization catalyst for the epoxy groups (Nacure® Super A218, metal salt of triflic acid in n-butanol, 25% wt., from King Industries), a surfactant (EFKA® 3034, which is a fluorocarbon containing organically modified polysiloxane, 50% wt. in methoxypropanol sold by CIBA), propylene glycol methyl ether as a solvent (Dowanol® PM from Dow Chemical Company) and a dye. Optional compounds were included in some compositions, such as colloidal silica (MA-ST-HV® from Nissan Chemical, 30% wt. dispersion in methanol) and hydrolyzed epoxysilanes.

The following epoxy compounds according to the invention were used in the examples: UVACure® 1500 (3',4'-epoxycyclohexylmethyl-3,4-epoxycyclohexanecarboxylate, from Allnex USA Inc.) and EPALLOY® 9000 (1,1,1-tris-(p-hydroxy phenyl) ethane triglycidyl ether).

The following comparative epoxy compounds were investigated: EGDGE (ethylene glycol diglycydyl ether), Erisys™ GE-30 (trimethylolpropane triglycidyl ether, abbreviated as GE-30, from CVC thermoset Specialties), Erisys™ GE-60 (sorbitol hexaglycidyl ether, abbreviated as GE-60, from CVC thermoset Specialties), Glymo (3-glycidoxypropyl-trimethoxysilane, from Evonik Industries) and KBE-402 (3-glycidoxypropyl methyldiethoxysilane). These epoxy compounds are relatively electron rich monomers, and the last two of them are epoxysilanes, which generate hybrid epoxy copolymers when used together with epoxy compounds devoid of reactive silicon atom.

The structures of the various epoxy compounds devoid of silicon atom are recalled hereunder:

of the Orma® lens spectrum before & after the sun exposure test, its change was neglected during the calculation.

The formula used to calculate the photo-degradation level of the dye in an epoxy coating coated on Orma® lens is described below, using the transmittance % at λ max:

$$\text{Dye photo-degradation} = (T\%_{dye\,\lambda\,max\,40\,h} - T\%_{dye\,\lambda\,max\,0\,h}) / (T\%_{Orma\,\lambda\,max\,40\,h} - T\%_{dye\,\lambda\,max\,0\,h})$$

| Epoxy compound | EGDGE (comparative) | Erisys™ GE-30 (comparative) | Erisys™ GE-60 (comparative) | UVACure® 1500 | EPALLOY® 9000 |
|---|---|---|---|---|---|
| Structure | *(chemical structure)* | *(chemical structure)* | *(chemical structure)* | *(chemical structure)* | *(chemical structure)* |
| C/O ratio | 2 | 2.5 | 2 | 3.5 | 4.8 |

The following dyes were used in the various compositions:

Dye A: ABS-420® (λ max=~421 nm), from Exciton Inc. (blue light blocking dye)

Dye B: Solvent Yellow 114 (λ max=~446 nm, quinoline dye), from American Dyestuff Corp.

Dye C: Solvent Blue 45 (λ max=~624 nm, anthracene dye, also called Savinyl Blue RS), from Clariant International Ltd.

The prepared formulations contained around 39-44% by weight of solids (dry extract weight relative to the weight of the composition). The dye was the last ingredient added to the compositions. Each of the coating solutions was deposited by spin coating onto a cleaned face of an Orma® lens previously cleaned with diluted NaOH (500 rpm for 5 s, then 1000 rpm for 10 s, examples 1-2, C1-C2), or by dip coating onto both faces of such lens (at a speed of 2.0 mm/s, all examples except examples 1-2, C1-C2). A pre-curing at 80° C. for 15 minutes and a curing at 110° C. for 3 hours were then performed. The coating thicknesses were 5 μm.

Evaluation of the Coating Performances a) Dye photo-degradation in epoxy coatings was measured by subjecting the prepared lenses to the Q-sun test. This test uses a Q-SUN® Xe-3 xenon chamber, purchased from Q-LAB, at a relative humidity of 20% (±5%) and at a temperature of 23° C. (±5° C.), reproducing full spectrum sunlight.

A sample lens coated with an epoxy coating containing at least one dye was measured by a Cary® 50 spectrophotometer to get a transmission (T%) spectrum. Then the lens was introduced in the xenon chamber and its convex side was exposed to the light for 40 h inside the Q-sun chamber. The lens was measured by the Cary® 50 spectrophotometer again to get a T % spectrum. An uncoated Orma® lens was used as the reference lens, tested before & after the 40 h sun exposure test as well. Because there was very little change For example, an Orma® lens coated with a blue dye coating (λ max of the dye: 580 nm) showed 80% of transmittance initially, which changed to 86% after 40 h of Q-sun exposure test. The reference Orma® lens showed 92% of initial transmittance at 580 nm, which only changed to 91.8% after 40 h of Q-sun exposure, indicating almost no change of Orma® lens at this wavelength. In this case, blue dye photo-degradation=(86-80)/(92-80)*100=50%.

b) Haze was measured as disclosed in WO 2012/173596, on a Hazeguard XL 211 Plus apparatus from BYK-Gardner in accordance with the standard ASTM D1003-00. As haze is a measurement of the percentage of transmitted light scattered more than 2.5° from the axis of the incident light, the smaller the haze value, the lower the degree of cloudiness. Generally, for optical articles described herein, a haze value of less than or equal to 0.3% is acceptable, more preferably of less than or equal to 0.2%.

c) Oxygen transmission rate was measured according to ASTM F1307-02 using a MOCON OX-TRAN® Model 2/21. The coated lens or BOPP (biaxially-oriented polypropylene) film samples were glued on metal masks using epoxy glue, allowed for air drying overnight in the ambient conditions, near 23° C., 50% relative humidity. The test conditions were at 35° C., 70% relative humidity. Minimum seven cycles of measurements were performed. One side of testing samples was exposed to a dry carrier gas (nitrogen with <2% hydrogen) and the other side was exposed to 100% dry oxygen gas. A permeation rate was calculated from the flow rate and concentration of the certified tank gas.

Compositions and results

The various ingredients used to prepare the compositions 1-8 according to the invention and the comparative compositions C1-C2 as well as the results of the tests performed are shown in the tables hereunder.

|  | Example | |
|---|---|---|
|  | C1 | C2 |
| Epoxy compound (%) | EGDGE 37.7 | GE-30 37.7 |
| Nacure ® Super A218 (%) | 5.7 | 5.7 |
| EFKA ® 3034 (%) | 0.1 | 0.1 |
| Dowanol ® PM (%) | 56.5 | 56.5 |

| Dye | C1-1 Dye A 0.04% | C1-2 Dye B 0.04% | C1-3 Dye C 0.15% | C2-1 Dye A 0.04% | C2-2 Dye B 0.04% | C2-3 Dye C 0.15% |
|---|---|---|---|---|---|---|
| Wt. % of epoxy compounds according to the invention (*) | 0 | | | 0 | | |
| Haze (%) | 0.4 | 2.0 | 0.9 | 0.6 | 1.0 | 0.8 |
| Photo-degradation (%) | 94 | 41 | 87 | 89 | 39 | 75 |

|  | Example 1 |
|---|---|
| Epoxy compound (%) | EPALLOY ® 9000 37.7 |
| Nacure ® Super A218 (%) | 5.7 |
| EFKA ® 3034 (%) | 0.1 |
| Dowanol ® PM (%) | 56.5 |

| Dye | 1-1 Dye A 0.04% | 1-2 Dye B 0.04% | 1-3 Dye C 0.15% |
|---|---|---|---|
| Wt. % of epoxy compounds according to the invention (*) | 100 | | |
| Haze (%) | 0.1 | 0.1 | 0.1 |
| Photo-degradation (%) | 16 | 7 | 13 |

|  |  | Example | | |
|---|---|---|---|---|
|  |  | 2 | 3 | 4 |
| Epoxy compound | GE-60 (%) | 3.4 | 10.3 | 3.4 |
|  | GE-30 (%) | 6.9 | 0 | 0 |
|  | UVACure ® 1500 (%) | 28.1 | 0 | 28.1 |
|  | EPALLOY ® 9000 (%) | 0 | 28.1 | 6.9 |
| Nacure ® Super A218 (%) |  | 5.5 | 5.8 | 5.5 |
| EFKA ® 3034 (%) |  | 0.1 | 0.1 | 0.1 |
| Dowanol ® PM (%) |  | 56.0 | 55.7 | 56.0 |

| Dye | 2-1 Dye A 0.04% | 2-2 Dye B 0.04% | 3-1 Dye A 0.04% | 3-2 Dye B 0.04% | 4-1 Dye A 0.04% | 4-2 Dye B 0.04% |
|---|---|---|---|---|---|---|
| Wt. % of epoxy compounds according to the invention (*) | 73 | | 73 | | 91 | |
| Haze (%) | 0.1 | 0.1 | 0.1 | 0.1 | 0.1 | 0.1 |
| Photo-degradation (%) | 12 | 14 | 5 | 0 | 4 | 1 |
| Oxygen transmission rate (cm³ · mil/(100 in² · day · atm)) (**) | 12.4 | | n.a. | | n.a. | |

(*) Relative to the total weight of epoxy compounds in the composition.
(**) Measured in the absence of dye, for a 10 μm thick coating.

|  |  | Example | | |
|---|---|---|---|---|
|  |  | 5 | 6 | 7 |
| Epoxy compound | GE-60 (%) | 1.7 | 2.3 | 2.77 |
|  | GE-30 (%) | 3.45 | 4.66 | 5.63 |
|  | UVACure 1500 (%) | 14.05 | 18.97 | 22.93 |
|  | Glymo (%) | 9.8 | 18.3 | 11.7 |
|  | KBE-402 ® (%) | 5.1 | 0 | 0 |
| Nacure ® Super A218 (%) |  | 2.75 | 3.71 | 4.49 |
| EFKA ® 3034 (%) |  | 0.05 | 0.068 | 0.082 |
| 0.1N HCl (%) |  | 3.3 | 4.2 | 2.7 |
| Colloidal silica (30% wt. in MeOH) (%) |  | 31.6 | 0 | 0 |
| Dowanol ® PM (%) |  | 28 | 47.8 | 49.7 |
| Dye A (%) |  | 0.04 | 0.04 | 0.04 |
| Wt. % of epoxy compounds according to the invention (*) |  | 41 | 43 | 53 |
| Dry extract weight % of epoxy compounds according to the invention (**) |  | 35 | 48 | 56 |
| Haze (%) |  | 0.1 | 0.1 | 0.1 |
| Photo-degradation (%) |  | 16 | 13 | 11 |

(*) Relative to the total weight of epoxy compounds in the composition.
(**) Relative to the dry extract weight of the composition.

In the lenses having epoxy coatings according to the invention, degradation of the various dyes was reduced to less than 30%, generally less than 20% under the Q-sun test conditions, while lenses having comparative epoxy coatings (with no epoxy compounds comprising a cycloaliphatic or aryl group such as in comparative examples C1-C2 or with such epoxy compounds in an insufficient amount) tend to photo-degrade the same dyes up to 94% under the same conditions.

As can also be seen, all epoxy coatings according to the invention showed low haze (0.1%) with all the dyes, while comparative coatings generally had higher haze levels, up to 2% (comparative example C1). These low haze results demonstrate that there is a good compatibility between the epoxy compounds according to the invention and the dye molecules.

The photo-degradation of the dyes can be further reduced by incorporating in the coating composition at least one UV absorber. For example, when 3% by weight of Tinuvin® 1130 were incorporated in the compositions of examples 5-7, photo-degradation of the ABS-420® dye during the Q-sun test was reduced from 11-16% down to 5-8%.

Another means to reduce the photo-degradation of the dye is to deposit on the epoxy coating according to the invention an antireflection coating acting as an oxygen barrier or an UV shield. Two of such antireflection coatings have been used in examples 3-1B and 3-1C shown in the table below and reduced the photo-degradation of the ABS-420® dye during the Q-sun test from 12% down to 0%:

|  | Example | | | |
| --- | --- | --- | --- | --- |
|  | 3-1 | 3-1A | 3-1B | 3-1C |
| Epoxy coating containing 0.04% dye A | Yes | Yes | Yes | Yes |
| Primer | No | Yes | Yes | Yes |
| Hard coat | No | Yes | Yes | Yes |
| Antireflection coating 1 | No | No | Yes | No |
| Antireflection coating 2 | No | No | No | Yes |
| Haze (%) | 0.1 | 0.1 | 0.1 | 0.1 |
| Photo-degradation (%) | 12 | 15 | 0 | 0 |

The lens of example 3-1A is the lens of example 3-1, further coated in this order with a polyurethane-based impact-resistant primer with a thickness of 1 micron (Witcobond latex W-234®), and an abrasion-resistant coating with a thickness of 3 microns obtained by depositing and curing the composition of example 3 of the patent EP 0614957 (comprising γ-glycidoxypropyl trimethoxysilane, dimethyldiethoxysilane, colloidal silica and aluminium acetylacetonate). It can be seen that such coatings hardly alter the resistance to photo-degradation of the dye present in the epoxy coating.

The lens of example 3-1B is the lens of example 3-1A, further coated with the antireflective coating of example 6 of the patent application WO 2008/107325. Said coating was deposited by evaporation under vacuum on the abrasion resistant coating of the lens of example 3-1A. Said antireflection coating comprises a 150 nm thick $SiO_2$ sub-layer and the stack $ZrO_2/SiO_2/ZrO_2/ITO/SiO_2$ (respective thicknesses of the layers: 29, 23, 68, 7 and 85 nm). An ITO layer is an electrically conductive layer of indium oxide doped with tin ($In_2O_3$:Sn).

The lens of example 3-1C is the lens of example 3-1A, further coated with the front face antireflective coating of example 1 of WO 2013/171435, with a 6.5 nm thick indium tin oxide layer interleaved between the 73 nm thick $ZrO_2$ layer and the 110 nm thick $SiO_2$ layer.

The invention claimed is:

1. An optical filtering coating composition for improving photostability of at least one absorbing dye, comprising:
   at least one absorbing dye that is selected from a porphyrin and a quinoline, has a conjugated chromophore and at least partially inhibits transmission of light within the 400-500 nm wavelength range;
   one or more epoxy compounds comprising at least one cycloaliphatic or aryl group; and
   the ratio: number of carbon atoms/number of oxygen atoms in said at least one epoxy compound is higher than or equal to 3, and the dry extract weight of such epoxy compounds represents more than 33% of the dry extract weight of the composition;
   wherein said optical filtering coating composition provides a coating upon curing, in which the photo-degradation of said absorbing dye is less than 30% after exposure of the coating deposited on a reference lens for 40 hours to light in a Q-SUN Xe-3 xenon test chamber;
   wherein the photo-degradation is calculated by the formula:

$(T\%_{dye\ 40\ h} - T\%_{dye\ 0\ h})/(T\%_{ref\ 40\ h} - T\%_{dye\ 0\ h})$ where:
   $T\%_{dye\ 40\ h}$ is the transmittance % of the reference lens coated with said coating after 40 hours light exposure;
   $T\%_{dye\ 0\ h}$ is the transmittance % of the reference lens coated with said coating before light exposure; and
   $T\%_{ref\ 40\ h}$ is the transmittance % of the uncoated reference lens after 40 hours light exposure;
   wherein the transmittances are measured at a wavelength corresponding to a maximum absorption peak of said absorbing dye.

2. The composition of claim 1, wherein the ratio: number of carbon atoms/number of oxygen atoms is higher than or equal to 3.3.

3. The composition of claim 2, wherein the ratio: number of carbon atoms/number of oxygen atoms is higher than or equal to 3.5.

4. The composition of claim 1, wherein the ratio: number of carbon atoms/number of oxygen atoms is higher than or equal to 4.

5. The composition of claim 4, wherein the ratio: number of carbon atoms/number of oxygen atoms is higher than or equal to 4.5.

6. The composition of claim 1, wherein the absorbing dye is present in an amount ranging from 0.01 to 1.25% relative to the dry extract weight of the composition.

7. The composition of claim 1, wherein the absorbing dye at least partially inhibits transmission of light within the 415-455 nm wavelength range.

8. The composition of claim 1, wherein the absorbing dye selectively inhibits transmission of light within said wavelength range.

9. The composition of claim 1, further defined as neither comprising any UV absorber nor free radical scavenger.

10. The composition of claim 1, further defined as comprising at least one UV absorber and/or at least one free radical scavenger.

11. The composition of claim 1, wherein the cycloaliphatic group is a cycloalkyl group.

12. The composition of claim 1, wherein the epoxy compound comprising at least one cycloaliphatic or aryl group comprises at least one aryl glycidyl ether group or β-(3,4-epoxycyclohexyl)alkyl group.

13. The composition of claim 1, wherein the epoxy compound comprising at least one cycloaliphatic or aryl group comprises at least two epoxy groups.

14. An optical article having at least one main surface comprising a coating improving photostability of at least one absorbing dye, wherein the coating is obtained by depositing on a substrate and curing an optical filtering coating composition comprising:
   at least one absorbing dye that is selected from a porphyrin and a quinoline, has a conjugated chromophore and at least partially inhibits transmission of light within the 400-500 nm wavelength range;

one or more epoxy compounds comprising at least one cycloaliphatic or aryl group; and the ratio: number of carbon atoms/number of oxygen atoms in said at least one epoxy compound is higher than or equal to 3, and the dry extract weight of such epoxy compounds represents more than 33% of the dry extract weight of the composition, wherein the photo-degradation of said absorbing dye contained in said coating is less than 30% after exposure of the coating deposited on a reference lens for 40 hours to light in a Q-SUN Xe-3 xenon test chamber;

wherein the photo-degradation is calculated by the following formula:

$$(T\%_{dye\ 40h} - T\%_{dye\ 0h})/(T\%_{ref\ 40h} - T\%_{dye\ 0h})$$

where:

$T\%_{dye\ 40\ h}$ is the transmittance % of the reference lens coated with said coating after 40 hours light exposure;

$T\%_{dye\ 0\ h}$ is the transmittance % of the reference lens coated with said coating before light exposure; and $T\%_{ref\ 40\ h}$ is the transmittance % of the uncoated reference lens after 40 hours light exposure;

wherein the transmittances are measured at a wavelength corresponding to a maximum absorption peak of said absorbing dye.

15. The optical article of claim 14, further comprising at least one mineral layer.

16. The optical article of claim 15, wherein the at least one mineral layer is at least one mineral layer of an antireflection coating.

17. The optical article of claim 14, further defined as an optical lens.

18. The optical article of claim 14, further defined as an ophthalmic lens.

19. A process for improving photostability of at least one absorbing dye contained in a coating, said process comprising:

curing an optical filtering coating composition comprising said at least one epoxy compound and said at least one absorbing dye;

wherein said at least one epoxy compound comprises at least one cycloaliphatic or aryl group, with a ratio of number of carbon atoms/number of oxygen atoms in the at least one epoxy compound being greater than or equal to 3;

wherein said at least one absorbing dye is selected from a porphyrin and a quinoline, has a conjugated chromophore and at least partially inhibits transmission of light within the 400-500 nm wavelength range; and wherein the dry extract weight of said at least one epoxy compound represents more than 33% of the dry extract weight of the composition;

wherein the photo-degradation of said absorbing dye contained in said coating is less than 30% after exposure of the coating deposited on a reference lens for 40 hours to light in a Q-SUN Xe-3 xenon test chamber, wherein the photo-degradation is calculated by the following formula:

$$(T\%_{dye\ 40h} - T\%_{dye\ 0h})/(T\%_{ref\ 40h} - T\%_{dye\ 0h})$$

where:

$T\%_{dye\ 40\ h}$ is the transmittance % of the reference lens coated with said coating after 40 hours light exposure;

$T\%_{dye\ 0\ h}$ is the transmittance % of the reference lens coated with said coating before light exposure; and $T\%_{ref\ 40\ h}$ is the transmittance % of the uncoated reference lens after 40 hours light exposure;

wherein the transmittances are measured at a wavelength corresponding to a maximum absorption peak of said absorbing dye.

* * * * *